Nov. 2, 1943.　　　　E. P. PEARSON　　　　2,333,334
METHOD OF SEPARATING AND RECOVERING POTASSIUM CHLORIDE AND BORAX
Filed Oct. 16, 1939
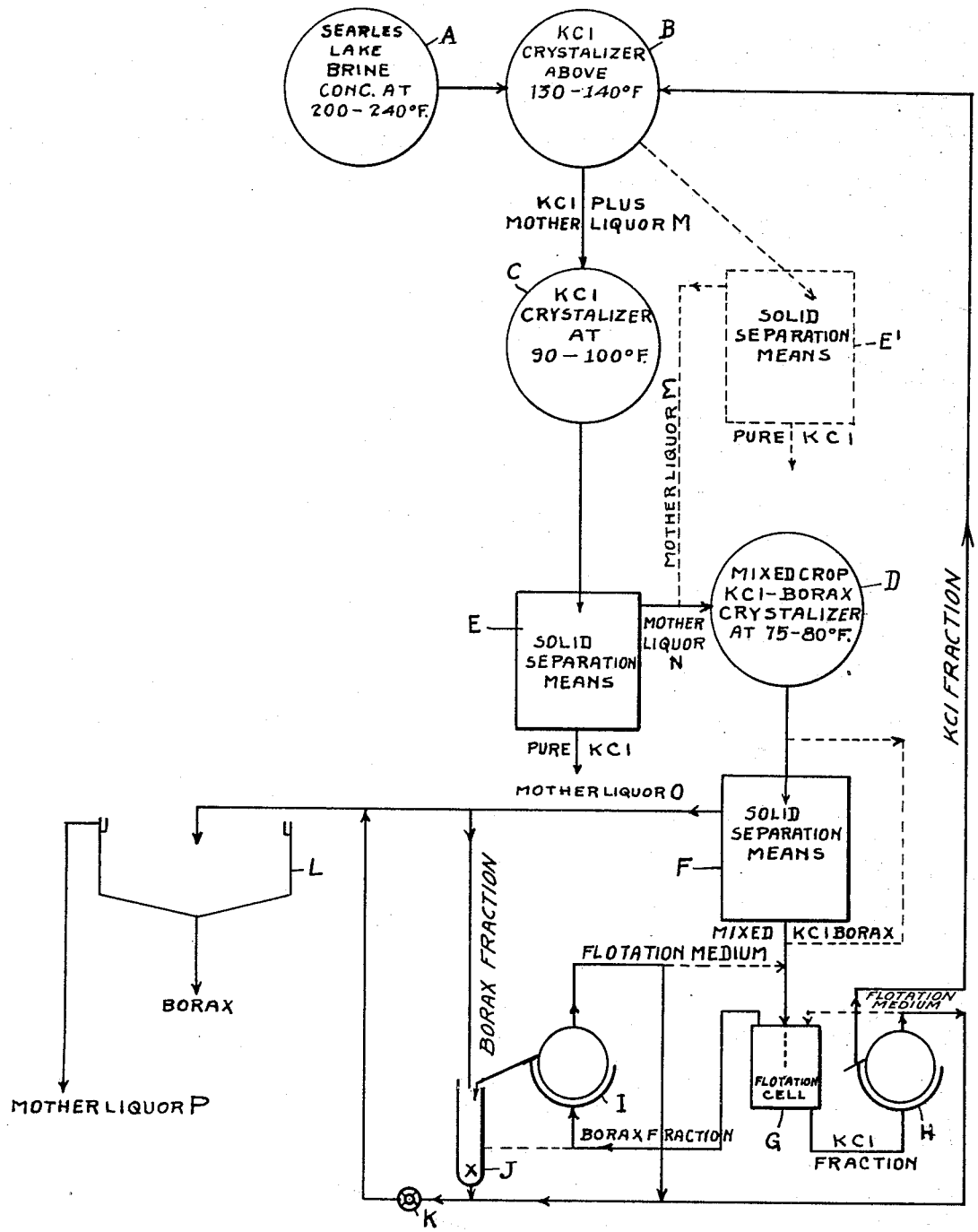
Inventor
Edward P. Pearson
By Lyon & Lyon
Attorneys Patented Nov. 2, 1943

2,333,334

UNITED STATES PATENT OFFICE 2,333,334

METHOD OF SEPARATING AND RECOVERING POTASSIUM CHLORIDE AND BORAX

Edward P. Pearson, Trona, Calif., assignor to American Potash & Chemical Corporation, Trona, Calif., a corporation of Delaware Application October 16, 1939, Serial No. 299,678

10 Claims. (Cl. 23—298)

The present invention relates to improvements in the separation and recovery of borax and potassium chloride from mixtures and solutions containing both. More particularly, it has reference to the recovery of pure potassium chloride and sodium tetraborate decahydrate, i. e., borax, from natural brines.

While the present invention has been designed and utilized primarily for the separation and recovery of potassium chloride and borax from solutions containing them, certain features obviously have application in a number of other instances where there may be available a solid mixture of those salts; it is understood that my invention contemplates those uses.

It is an object of my invention to devise an improved process of separating mixtures of potassium chloride and borax and more especially a process of recovering potassium chloride and borax as commercial products from solutions containing both salts, whereby greater yields of both salts are made possible and the volume of liquor handled per unit of salts recovered is decreased.

Another object is the provision of a series or combination of manipulations by which flotation may be used for recovering potassium chloride and borax as pure crops, if desired, from solutions concentrated with respect to both of them. Froth flotation concentrates and tailings usually contain at least small percentages of the other component, and I provide steps by which the separate flotation fractions may be conveniently cleaned up and freed of the other component and both products obtained in essentially pure form. Solutions made available by the crystallization used in the invention are employed for purifying the flotation fractions, without requiring the use of extra steps or manipulations. At the same time, impurities are removed from the flotation fractions by means of solutions from which they are subsequently recovered as commercial products; mother liquor values are also preserved for further treatment.

Other objects and advantages of my invention will also appear from the following description and are to be considered part of my invention.

The separation and recovery of potassium chloride and borax from solutions containing both has been a stumbling block in the treatment of natural brines heretofore solved, practically, only by a supersaturation-controlled crystallization process which permits the recovery of a crop of potassium chloride at a temperature below the point of saturation with sodium tetraborate, while borax is held in a supersaturated state. The borax is then recovered separately in a second slower crystallization at a lower temperature. Since the supersaturated solution, before borax crystallization, is saturated with potassium chloride, that salt will tend to crystallize during the second cooling. Also, decahydrate borax removes considerable water of crystallization, which is comparable to concentrating the solution, and this also tends to cause deposition of KCl. To prevent contamination of the borax with KCl, the KCl-mother liquor is diluted before cooling to the lower temperature. This dilution is an undesirable feature since it represents water which must be evaporated from the final mother liquor when it is returned to the evaporation step in a cyclic process, and also because the added water dissolves some borax as well as the KCl. My purpose has been to devise a method of recovering borax and potassium chloride which does not employ dilution of the liquor, but rather accepts simultaneous deposition of KCl and borax, and then separates the two salts from the jointly deposited crop.

As previously indicated, the present process has application in the recovery of potassium chloride and borax both from solutions and from solid mixtures of those salts. In the recovery of said salts from solutions, a mixture of said salts is first obtained by crystallization and then subjected to certain separation and purification steps. Hence, an exposition of the use of the invention in the treatment of solutions automatically comprehends the treatment of solid mixtures of the salts.

In accordance with my invention, a solution containing potassium chloride and borax is first treated so as to crystallize a mixed crop of those salts and that crop is then subjected to a process of froth flotation under such conditions that the two salts are separately recoverable. The exact steps employed in the crystallization process will be determined by the temperature and concentration of the solution and especially by the ratio between the concentrations of the two salts in the solution. If the solution contains only potassium chloride and borax, either concentration or cooling can be used to effect the crystallization. With other solutes present, that process is chosen which will most effectively avoid contamination of the mixed crop. Often, the relation between the concentrations of potassium chloride and borax will permit the fractional crystallization of a portion of one of said salts in essentially pure form before the other salt begins to crystallize. When this is possible, I prefer to effect the crystallization of the pure salt and to conduct the fractional crystallization so that there will be present in the system a liquor saturated with the crystallizing salt but unsaturated with the other salt. Such a liquor is an ideal medium for leaching said unsaturated salt from the flotation fraction consisting primarily of the saturated salt. Thus a solution from which potassium chloride is being crystallized at a temperature at which saturation with borax has not been reached will dissolve borax, but not potassium chloride. Hence, said solution is an ideal medium for removing borax impurities from the potassium chloride flotation crop, subsequently produced.

The use of mother liquor from the crystallization process to purify flotation fractions subsequently obtained is an important feature of any invention. Flotation seldom produces complete separation of two salts and where pure products are desired, they must be recrystallized or otherwise purified. Heretofore, this has usually necessitated the provision of means for disposing of end liquors containing the impurities, often with loss in recovery efficiency. By conducting the crystallization so that there are present already solutions which will dissolve flotation fraction impurities, a number of advantages accrue. The impurities are dissolved directly in a solution which will subsequently be treated to crystallize the salt which is the impurity, but which will not dissolve the major ingredient of the fraction being leached. In fact, usually, the solution for leaching can be one from which a pure crop of one ingredient has just been crystallized. Hence, the leached and purified flotation fraction is recovered directly as a commercially pure product with a directly crystallized crop of pure salt, all of that salt thus being taken from the process at one point. Also, the leached impurity in solution constitutes a recoverable ingredient, being crystallized as further mixed crop crystals. Furthermore, no water is added to the system to remove the impurity, hence recovery efficiency is not impaired.

Following the crystallization of a mixed crop of potassium chloride and borax, and its separation from at least the bulk of its mother liquor, I subject said mixed crop to froth flotation under conditions to obtain a separation of the two salts. In the presence of suitable flotation reagents which selectively film one of the solid phases and render the particles thereof hydrophobic while the other particles remain hydrophylic, either borax or potassium chloride can be floated while the other is unaffected and remains dispersed throughout the flotation medium. Borax and potassium chloride are readily separable in this way, either salt being floated by using the proper collector reagent for the filming process. The filmed particles tend to draw together into floccules, and may be separated from the hydrophylic, or unfilmed, particles and the main portion of the flotation medium by producing a froth in the suspension of solids in the flotation medium, the air or gas bubbles of the froth attaching themselves to the unwetted hydrophobic particles and carrying them to the top of the body of flotation medium. In addition to selective filming, or flotation promoting agents, substances which enhance the production of froth are useful in the flotation process, in conjunction with mechanical means for maintaining a rising stream of air or other gas bubbles in the flotation medium.

The flotation steps of the present invention may be carried out under a wide range of working conditions using various flotation promoting agents and flotation mediums of divers compositions. Saturated aqueous solutions of potassium chloride and borax or an aqueous solution which will become saturated with said salts during the process, without reacting to form insoluble or undesirable compounds, will serve acceptably as a flotation medium. The presence of flotation promoting agents is desirable and aids materially in the flotation of either borax or potassium chloride.

Flotation of borax from potassium chloride is aided by many flotation reagents, but I have accomplished most effective separations when using oleic acid, xylene, turpentine, kerosene, and naphthenic acid as promoting agents. Substances of the same general classes as those listed have similar application to the flotation of borax. For example, other fatty acids may be used; crude commercial or impure forms of naphthenic acid may be used in place of the pure material; xylene can be replaced by other methyl benzenes, such as toluene. Mixtures of oleic acid with xylene, kerosene, or turpentine promote the flotation of borax to a greater extent than is possible with the single reagents. Naphthenic acid is especially advantageous as it acts also as a depressor of potassium chloride, less of that salt being found with the borax froth. For the reverse flotation of potassium chloride from borax I prefer to employ the product known commercially as "Emulsol 480" (described in United States Patent No. 2,120,217 to B. R. Harris). These reagents may be added to the salt mixture before it is suspended in the flotation medium or may be dispersed in the medium. The concentration of reagents should be held as low as is consistent with satisfactory flotation and in a continuous process further quantities of reagent are added as needed to maintain the desired concentration thereof.

Reagents which are solely frothers are also useful either alone or in combination with collectors. Borax tends to separate from potassium chloride and to collect even in the unstable froth of reagent-free aqueous solutions. This is especially true when appreciable concentrations of alkali carbonate are present in the solution. For this reason, I prefer to employ flotation reagents which activate borax and improve its flotation, thus following the natural separation tendency of the two salts, rather than opposing the same.

As was noted briefly above, the presence of other alkali metal salts, especially those of sodium and potassium in the flotation system, aids materially in the flotation of borax. Salts which supply the carbonate ion to the system are particularly desirable. Alkali metal sulfates and metaborates also improve borax flotation. For example, a reagent-free solution containing approximately 6.5% of $Na_2CO_3$ floated 20% of a quantity of borax suspended in it in a single flotation treatment, while a similar solution, containing no carbonate, floated only about a fourth as much borax with the same treatment. High concentrations of alkaline salts are preferred, but some benefit will result even from very minor percentages and the actual amount present will often depend upon the solutions which are normally available for use as a suspension medium. In a closed flotation cycle, higher alkaline salt concentrations, approaching saturation there-with, are quite practical since the flotation medium is continuously recovered and returned to the cell. I prefer to use a flotation medium containing at least 6 to 8% of sodium carbonate or the equivalent. Alkali metal salts serve to improve borax flotation, both with and without added flotation reagents, i. e., frothers, depressants, collectors, etc.

Flotation of borax in a medium consisting of a saturated solution of borax is also, we have found, materially improved by dehydrating the borax prior to suspending it in the flotation cell. The percentage of borax floated increases as the amount of water in the starting product decreases, especially where the dehydration is carried below five mols of remaining water; thus the advantage received from dehydrating the starting material applies as well to hydrates lower than the decahydrate as to the decahydrate.

Mixtures of KCl and borax to be treated by froth flotation for separation into their components will often be in wet condition, such as those which originated, for example, as a joint crystallization crop. Such mixtures usually may be introduced directly into the flotation system, together with adhering mother liquor. In fact, such mother liquor often is ideally suited for use as the suspension medium in the flotation cell.

Following the preparation of a suspension of the solids to be separated in a suitable medium containing a flotation reagent or reagents favoring the flotation of one solid constituent, gas is introduced into the suspension in sufficient quantity to establish and maintain a froth therein. The gas bubbles attach themselves to the hydrophobic and filmed particles, which are thus segregated from the hydrophylic particles, there being produced in the apparatus, separate layers of froth and residual solids. For carrying out the flotation process of my invention I prefer to employ mechanical means of introducing the gas, though other methods, such as chemical or evacuation can be used. Agitation, sub-aeration, and pneumatic type flotation cells have been employed successfully, with somewhat more satisfactory results being obtained, when flotating borax, with agitation type cells. Higher recoveries are obtained when a battery or series of flotation cells are employed. A preliminary cell or cells may be used to float a considerable quantity of one of the salts and subsequent cells operated with the same flotation reagents to segregate more of the floated fraction from the preliminary tailings. Alternatively, either the floated fraction or the tailings from the preliminary cell or cells can be subjected to froth flotation in the presence of different flotation reagents which film the salt left in the tailings in the first step. Using this latter technique on the floated portion, less solids need be floated in the refining steps, since the original froth contains only a minor percentage of the other ingredient of the original mixture and complete removal thereof is more readily attained. The counter-washing steps of my invention, however, make it unnecessary to reach high purity of either salt in the flotation steps, when the mixture of potassium chloride and borax is crystallized jointly from a solution containing them.

Froth flotation can be employed to separate mixtures of borax and potassium chloride from any source, but is particularly useful for treatment of mixed crops of those salts crystallized jointly from solutions containing them. Regardless of the source of the mixture, the principles and steps of the flotation process given herein are applicable. When the mixed salts have been crystallized from solution, the mother liquor is often an ideal liquor for use as the flotation medium, especially when derived from a nautral brine containing quantities of other salts of an alkaline nature which aid the flotation of borax. Such a case is presented by the recovery of potassium chloride and borax from Searles Lake brine.

In order to illustrate the application of froth flotation to a natural brine containing potassium chloride and borax, I will describe my invention as it is applied to the recovery of those salts from Searles Lake brine in conjunction with the basic potassium chloride crystallization process described in United States Patent 1,921,481 to C. F. Ritchie et al. This description is given in conjunction with the figure of the drawings which represents a flow sheet of my improved process.

By the process of that patent, hot concentrated Searles Lake brine at a temperature of 200 to 240° F. and close to saturation with potassium chloride is cooled first to a temperature of 130 to 140° F., where saturation with borax is reached. Potassium chloride crystallizes during the cooling but no borax. The remaining liquor, or the sludge of crystallized KCl and liquor is then cooled under conditions which maintain borax supersaturated to a temperature of 90 to 100° F. At lower temperatures the liability of incurring release of the borax supersaturation and crystallization thereof is imminent. The combined crops, when separated from the liquor, termed KCl-mother liquor, represent a good commercial potassium chloride product. Borax is then crystallized from the KCl-mother liquor, after dilution thereof to maintain KCl in solution, by further cooling to about 75–80° F. Dilution prior to the crystallization of borax increases the cost of the cyclical process, since any water so added must be evaporated later when the mother liquor is returned to the evaporation step, decreasing the capacity of the system.

In accordance with the preferred process of my invention, the procedure embracing cooling hot concentrated Searles Lake brine to a temperature of 90–100° F. while maintaining borax supersaturated is retained. This is effected in at least two stages divided so that the cooling in one stage is stopped somewhat above the temperature at which the liquor becomes saturated with a borate solid phase, namely, above about 130–140° F. This is preferred so as to provide in the process a liquor, other than the hot concentrated liquor, which is saturated with potassium chloride but still unsaturated with borax, for reasons which appear later. In the subsequent cooling down to 90–100° F., the process is controlled so that no borate solid phase is precipitated, the borax remaining supersaturated, and there is recovered, as a solid phase, only pure potassium chloride. The combined crops of pure potassium chloride produced by the cooling down to 90–100° F. are separated from the mother liquor by suitable means and the cooling is then continued in a separate stage to the final temperature of 75–80° F. In this final step, no dilution water is added, and a mixed crop of potassium chloride and borax separates out. Instead of depositing pure potassium chloride in two or more stages of cooling down to 90–100° F., by maintaining borax supersaturated, the liquor remaining from the cooling down to the saturation point of a borate solid phase may be cooled directly without dilution to the final temperature of 75–80° F. With either method of producing the mixed potassium chloride-borax crop, froth flotation is applied to said crop under conditions which result in the separate production of commercially pure potassium chloride and borax. The purification of the flotation fractions is made possible by the provision of certain novel counterwashing steps in my process.

I will now describe one specific example of the invention in connection with the accompanying drawing. Hot concentrated Searles Lake brine is taken from a storage vat or tank A, and this hot concentrated Searles Lake brine has the following representative analysis:

Hot, concentrated S. L. brine

| | Per cent |
|---|---|
| KCl | 19.94 |
| NaCl | 6.84 |
| $Na_2CO_3$ eq | 6.57 |
| $Na_2SO_4$ | 1.61 |
| $Na_2B_4O_7$ eq | 8.82 |
| Misc. and $H_2O$ | 56.22 |
| Total | 100.00 |

The hot brine is first cooled in a crystallizing step B to a temperature not below, and preferably somewhat above, its point of saturation with borax, namely, 130–140° F. Potassium chloride is crystallized, producing mother liquor M, which is found to possess the following analysis:

Mother liquor M

| | Per cent |
|---|---|
| KCl | 12.92 |
| NaCl | 5.99 |
| $Na_2CO_3$ eq | 6.26 |
| $Na_2SO_4$ | 1.64 |
| $Na_2B_4O_7$ eq | 9.56 |
| Misc. and $H_2O$ | 63.63 |
| Total | 100.00 |

In the preferred process, this mother liquor together with the potassium chloride crystallized are passed as a sludge to a second crystallizing step C, wherein the same is further cooled to not below about 90–100° F., under conditions controlled to assure supersaturation of the borax and precipitate potassium chloride only and to form mother liquor N.

The combined potassium chloride crops, forming a sludge with the mother liquor N, which is saturated with potassium chloride and supersaturated with borax, are separated from the mother liquor N by suitable solids-liquor separating means E. The solids represent, after final drying, a commercial grade of potassium chloride. In some cases, it may be preferable to deposit only the initial pure potassium chloride crop (omitting crystallizing step C). This alternative procedure is shown in dotted lines to the right of the preferred path; the potassium chloride and mother liquor M from the initial crystallization in B are transferred to liquor-solids separating means E', where the potassium chloride is obtained pure, leaving mother liquor M saturated with potassium chloride and slightly undersaturated with borax for further treatment.

In the preferred process, the mother liquor N obtained is found to possess the following analysis:

Mother liquor N

| | Per cent |
|---|---|
| KCl | 11.69 |
| NaCl | 6.24 |
| $Na_2CO_3$ eq | 6.86 |
| $Na_2SO_4$ | 2.28 |
| $Na_2B_4O_7$ eq | 9.87 |
| Misc. and $H_2O$ | 63.06 |
| Total | 100.00 |

In accordance with my invention, the mother liquor N (or the mother liquor M if the alternate process is used) is cooled without dilution to a final temperature of about 75 to 80° F. in the crystallizing step D. A mixed crop of potassium chloride and borax, suspended in a final mother liquor O still appreciably supersaturated with borax, saturated with potassium chloride and close to saturation with other sodium salts is produced by this cooling.

A mixed crop of potassium chloride and borax, recovered by settling (as in F) as a heavy sludge containing some mother liquor showed the following analysis:

Mixed crop of KCl and borax

| | Per cent |
|---|---|
| KCl | 15.87 |
| $Na_2B_4O_7.10H_2O$ | 46.21 |
| Misc. and $H_2O$ | 37.92 |
| Total | 100.00 |

The mother liquor O obtained possessed the following analysis:

Mother liquor O

| | Per cent |
|---|---|
| KCl | 9.42 |
| NaCl | 6.52 |
| $Na_2CO_3$ eq | 7.17 |
| $Na_2SO_4$ | 2.38 |
| $Na_2B_4O_7$ eq | 8.68 |
| Misc. and $H_2O$ | 65.83 |
| Total | 100.00 |

The mother liquor O tends to remain supersaturated with borax for an appreciable period after the final temperature is reached, as the borax crystallization lags considerably behind the cooling; in fact, true equilibrium with borax is reached only after long periods. Potassium chloride, on the other hand, crystallizes rapidly. I have also found that the mother liquor O when supersaturated with borax has a potassium chloride solubility almost 1% below that of the same liquor after equilibrium with borax has been approached or reached. For this reason, about 0.40 gram of potassium chloride, once precipitated, are redissolved by 100 grams of the original liquor if the solids are allowed to remain in contact with the liquor until the liquor approaches this equilibrium with borax. I take a two-fold advantage of these facts in the opertion of the process of my invention. The mixed crop of potassium chloride and borax is separated relatively quickly from the mother liquor by separation means F, after the final temperature of cooling is reached, and the mother liquor O, supersaturated with borax, is allowed to approach equilibrium with borax separately in an agitated tank L. In the latter, borax crystalizes and a mother liquor P is formed which is under saturation with potassium chloride and saturated with borax. In this way, a larger crop of potassium chloride is recovered in F and part of the borax is recovered directly in tank L in a condition free of potassium chloride. These results may be attained in several ways, but the particular mode of operation chosen ties in advantageously with the flotation treatment of the mixed crop. For example, the mother liquor P obtained was found to contain the following analysis:

*Mother liquor P*

|  | Per cent |
|---|---|
| KCl | 10.31 |
| NaCl | 6.68 |
| $Na_2CO_3$ eq | 7.34 |
| $Na_2SO_4$ | 2.44 |
| $Na_2B_4O_7$ eq | 5.82 |
| Misc. and $H_2O$ | 67.41 |
| Total | 100.00 |

In applying froth flotation to the separation of the mixed crop, using suitable flotation reagents or aids for floating borax, concentrated Searles Lake brine, or a mother liquor from the crystallization of potassium chloride and borax from such concentrated brine, is peculiarly well adapted for use as the flotation medium. These solutions contain appreciable quantities of the metaborates, sulfates and carbonates of the alkali metals, all of which improve the flotation of borax. The mixed crop of potassium chloride and borax, together with its mother liquor O, may be sent directly to a flotation cell G as the mother liquor supports the flotation of borax and is saturated with both salts. This treatment is shown on the drawing by the dotted line path from crystallizer D to cell G. As has already been noted, however, the liquor is supersaturated with borax and borax will continue to crystallize during the flotation. As the liquor approaches saturation with borax, it becomes unsaturated with potassium chloride and will dissolve some of the already precipitated potassium chloride. Normally, the rate of release of supersaturation from this liquor is slow, and a borax flotation separation step can be carried out before appreciable potassium chloride is redissolved.

I prefer, however, to separate the mixed crop from the bulk of its mother liquor promptly, as by settling, filtering, centrifuging, or the like, as shown at F. The bulk of the mother liquor O then does not have an opportunity to redissolve precipitated potassium chloride, but approaches equilibrium with borax in agitated settling tank L.

When the mixed crop is separated from the bulk of its mother liquor before flotation, I effect the latter in a special liquor which is retained in the flotation system, being recovered from the flotation fractions and recycled. Any aqueous solution saturated with potassium chloride and borax may be used as the flotation medium. In order to avail myself of the valuable property of sodium carbonate in aiding the flotation of borax, I prefer to use natural brine or some solution present in the recovery system which contains sodium carbonate in appreciable quantities. Mother liquor P, when re-saturated with potassium chloride, is ideally suited for this purpose.

In the preferred example given, I have employed naphthenic acid (hexahydrobenzoic acid) as the flotation reagent. Commercially, there are several products known as the equivalent of naphthenic acid and any of them are usable in my process; naphthone acids A and D are products of this character. Xylene with oleic acid have also been found particularly satisfactory. Only very small concentrations of these reagents are required, on the order of magnitude of 1 cc. or less per liter of flotation medium, but larger quantities are usable. Sometimes higher concentrations do not give as good yields, but the results are still acceptable. With nephthenic acid the preferred concentration is between 0.003 and 0.004%. With xylene and oleic acid, xylene concentrations of from 0.2 to 0.8% are preferred and oleic acid concentrations of 0.04 to 0.15% are preferred. When turpentine and oleic acid are employed as a mixture for the flotation reagent, the preferred quantities are about the same as in the case of xylene and oleic acid. When turpentine alone is used, it generally should not be employed above about 0.0007%.

By the process described borax can be floated in a single stage to secure a product containing 1% or less of potassium chloride. However, considerable borax may remain behind with the potassium chloride tailings. As satisfactory separation of borax and potassium chloride is usually not accomplished in a single flotation stage, the tailings may be subjected to successive flotation steps until they have the desired purity. Both tailings and concentrates, even after continued flotation, will usually contain at least minor percentages of the opposite component. In my invention, however, complete separation of the two solids is not critical. There is available in the crystallization system a liquor which is saturated with potassium chloride but unsaturated with borax, and another which is unsaturated with potassium chloride but saturated with borax. These liquors are ideally suited for removing unseparated minor fractions of borax and potassium chloride, especially since said liquors are already in contact with and must be separated from solid potassium chloride and solid borax, respectively. These liquors are, respectively, the partially cooled brine in crystallizer B and mother liquor P. Hot concentrated brine may also be used for dissolving borax from the potassium chloride fraction.

To these ends, the borax flotation fraction, containing small amounts of potassium chloride, is transferred to a mixing trough J and from there to agitated tank L. Mother liquor P in the latter dissolves potassium chloride and only pure borax settles to the bottom, forming after drying a commercial product. When a special liquor is used for the flotation medium, the borax and potassium chloride fractions from cell G are filtered, using filters H and I, and the liquor returned to the cell G.

Potassium chloride from the flotation system is transferred to crystallizer B. Since the liquor therein is unsaturated with borax, the latter is dissolved from the flotation fraction, leaving pure potassium chloride, which mixes with the potassium chloride crystallizing therein. Thus, the entire crop of pure potassium chloride is recovered from the solid-liquor separation means E (or E').

By the process of my invention I am enabled to produce approximately 4% more potassium chloride and borax from a given evaporator system working on Searles Lake brine than by the super-saturation-control crystalization system of the prior art. An additional advantage of considerable importance is that this increased production is obtained with less steam used for evaporation.

While the particular process herein described is well adapted to carry out the objects of the invention, it is to be understood that the invention includes all such modifications and changes as come within the scope of the appended claims.

I claim:

1. The process of separating potassium chloride and borax, which comprises subjecting a mixture of said salts to froth flotation in an aqueous medium saturated with both of said salts and containing a borax flotation promoting agent from the group consisting of oleic acid, xylene, turpentine, kerosene, and naphthenic acid.

2. The process of recovering potassium chloride and borax from hot solutions containing them, which comprises cooling the solution beyond the saturation value of both potassium chloride and borax, precipitating a mixed crop of said salts and leaving a mother liquor supersaturated with borax, subjecting said mixed crop to froth flotation in the mixed crop mother liquor, separating the flotation fractions, and contacting the borax fraction with said mother liquor for a sufficient period to release further quantities of borax from said mother liquor and dissolve potassium chloride from said borax fraction.

3. The process of recovering potassium chloride and borax from hot solutions containing them, which comprises cooling the solution beyond the saturation value of both potassium chloride and borax, precipitating a mixed crop of said salts quickly, separating the mixed crop from the remaining liquor while the latter mother liquor remains supersaturated with borax, subjecting said mixed crop to froth flotation in an aqueous medium saturated with potassium chloride and borax forming a poassium chloride fraction and a borax fraction, crystallizing a further crop of borax from said mother liquor and forming a second mother liquor unsaturated with potassium chloride, and leaching potassium chloride from the borax flotation fraction with said second mother liquor.

4. In the separation of hydrated sodium tetraborate from mixtures by froth flotation, the step which comprises partially dehydrating the said borate prior to subjecting the mixture to flotation.

5. The process of recovering potassium chloride and borax from Searles Lake brine, which comprises concentrating said brine and producing a brine which will deposit potassium chloride and borax upon cooling, cooling said brine below saturation with potassium chloride but short of saturation with borax and precipitating a crop of pure potassium chloride, separating the potassium chloride from the liquor, further cooling said liquor and producing a mixture of potassium chloride and borax in mother liquor, subjecting said potassium chloride and borax mixture to froth flotation treatment in a quantity of said mother liquor containing a reagent of the group consisting of oleic acid, xylene, turpentine, kerosene and naphthenic acid having a preferential affinity for borax, and recovering the flotation fractions.

6. The process of recovering potassium chloride and borax from solutions containing them which comprises cooling the solution beyond the saturation value of both potassium chloride and borax and crystallizing a mixed crop of said salts, separating said mixed crop from the mother liquor while the latter is supersaturated with borax, crystallizing and separating a further crop of borax from said mother liquor and leaving a second mother liquor unsaturated with potassium chloride, subjecting said mixed crop to froth flotation and thereby segregating therefrom a crop of borax containing potassium chloride as an impurity, and leaching said borax flotation crop with said second mother liquor whereby potassium chloride in said crop is dissolved.

7. The process of recovering potassium chloride and borax from Searles Lake brine, which comprises concentrating the brine to approximate saturation with respect to potassium chloride at a high temperature, cooling the brine in a primary step to a temperature below the saturation point of KCl but above the saturation point of borax, separating the thereby crystallized potassium chloride from the warm, primary mother liquor, further cooling said liquor and crystallizing thereby a mixed crop of potassium chloride and borax, while producing a mother liquor supersaturated with borax, separating said mixed crop from the said supersaturated mother liquor, inducing a final crystallization of borax from said supersaturated mother liquor, thereby producing a final, cold, crystallization mother liquor unsaturated with respect to potassium chloride, subjecting the aforesaid mixed crop to froth flotation in an aqueous medium saturated with both potassium chloride and borax, said froth flotation yielding a potassium chloride fraction and a borax fraction, reacting said potassium chloride flotation fraction with the aforesaid warm primary mother liquor, reacting the aforesaid borax flotation fraction with the aforesaid final, cold, mother liquor, and recovering the purified potassium chloride fraction and a purified borax fraction.

8. A process of separating potassium chloride and borax, which comprises subjecting a mixture of said salts to froth flotation in an aqueous medium having an appreciable carbonate ion concentration, saturated with both of said salts and containing a borax flotation promoting agent from the group consisting of oleic acid, xylene, turpentine, kerosene, and naphthenic acid.

9. A process of separating potassium chloride and borax, which comprises subjecting a mixture of said salts to froth flotation in an aqueous medium, comprising a concentrated natural brine containing the chlorides, sulfates, carbonates, and borates of sodium and potassium and saturated with potassium chloride and borax, said aqueous medium containing a borax flotation promoting agent from the group consisting of oleic acid, xylene, turpentine, kerosene, and naphthenic acid.

10. A process of separating potassium chloride and borax, which comprises subjecting a mixture of said salts to froth flotation in an aqueous medium, comprising a brine originating from Searles Lake and saturated with both of said salts, said aqueous medium containing a borax flotation promoting agent from the group consisting of oleic acid, xylene, turpentine, kerosene, and naphthenic acid.

EDWARD P. PEARSON.